(12) United States Patent
Do et al.

(10) Patent No.: US 11,962,935 B2
(45) Date of Patent: Apr. 16, 2024

(54) VIDEO CALL RECORDING METHOD AND ELECTRONIC DEVICE THEREFOR

(71) Applicant: Samsung Electronics Co., Ltd., Suwon-si (KR)

(72) Inventors: Taewon Do, Suwon-si (KR); Jinkyu Kim, Suwon-si (KR); Shiva Prasad Chanduri, Suwon-si (KR); Vinayak Goyal, Suwon-si (KR); Yongtae Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 111 days.

(21) Appl. No.: 17/828,599

(22) Filed: May 31, 2022

(65) Prior Publication Data

US 2022/0295009 A1 Sep. 15, 2022

Related U.S. Application Data

(63) Continuation of application No. PCT/KR2020/017420, filed on Dec. 2, 2020.

(30) Foreign Application Priority Data

Dec. 2, 2019 (KR) .................. 10-2019-0158075

(51) Int. Cl.
*H04N 5/77* (2006.01)
*H04N 5/92* (2006.01)
*H04M 7/00* (2006.01)

(52) U.S. Cl.
CPC .................. *H04N 5/77* (2013.01); *H04N 5/92* (2013.01); *H04M 7/006* (2013.01)

(58) Field of Classification Search
CPC .................................. H04N 5/77; H04N 5/92
See application file for complete search history.

(56) References Cited

U.S. PATENT DOCUMENTS

| 10,536,278 B1* | 1/2020 | Donaldson ............ H04L 9/3247 |
| 2007/0070182 A1* | 3/2007 | Ryu ..................... H04L 65/762 |
| | | 348/14.02 |
| 2013/0298171 A1 | 11/2013 | Takeda et al. |
| 2014/0313276 A1* | 10/2014 | Cho ....................... H04N 7/147 |
| | | 348/14.07 |

(Continued)

FOREIGN PATENT DOCUMENTS

| KR | 10-2009-0010385 A | 1/2009 |
| KR | 10-2009-0029496 A | 3/2009 |

(Continued)

OTHER PUBLICATIONS

Korean Office Action dated Oct. 18, 2023, issued in Korean Application No. 10-2019-0158075.

*Primary Examiner* — Olisa Anwah
(74) *Attorney, Agent, or Firm* — Jefferson IP Law, LLP (57) ABSTRACT

A portable communication device supporting video calls is provided. The portable communication device can be configured to perform a video call on the basis of a first video codec and a first audio codec, receive, through a touch display, a request for recording the video call, and, if the first audio codec is not supported by a designated media container, record the video call on the basis of the first video codec and a second audio codec supported by the media container.

15 Claims, 7 Drawing Sheets

(56) References Cited

U.S. PATENT DOCUMENTS

2018/0048748 A1    2/2018  Lundstrom et al.
2019/0364245 A1*  11/2019  Kim ...................... H04N 5/272
2021/0250387 A1    8/2021  Do et al.

FOREIGN PATENT DOCUMENTS

KR    10-2016-0007410 A    1/2016
KR    10-2019-0007934 A    1/2019
WO       2020/009417 A1    1/2020

* cited by examiner

VIDEO CALL RECORDING METHOD AND ELECTRONIC DEVICE THEREFOR

CROSS-REFERENCE TO RELATED APPLICATION(S)

This application is a continuation application, claiming priority under § 365(c), of an International application No. PCT/KR2020/017420, filed on Dec. 2, 2020, which is based on and claims the benefit of a Korean patent application number 10-2019-0158075, filed on Dec. 2, 2019, in the Korean Intellectual Property Office, the disclosure of which is incorporated by reference herein in its entirety.

BACKGROUND

1. Field

The disclosure relates to a video call recording method and an electronic device therefor.

2. Description of Related Art

In order to improve the sound quality and efficiency of a voice call through a circuit switched (CS) network, a voice call through a packet switched (PS) network is used. For example, voice over Internet protocol (VoIP) technology based on Internet protocol (IP) may be used. In the VoIP technology, audio and/or video may be exchanged through data packets. VoIP technology may be applied to various network platforms based on packet data networks.

An electronic device may be configured to encode a voice and/or image of a user and transmit a packet including data on the generated voice and/or image. For example, the electronic device may encode a voice and/or an image using a codec.

The above information is presented as background information only to assist with an understanding of the disclosure. No determination has been made, and no assertion is made, as to whether any of the above might be applicable as prior art with regard to the disclosure.

SUMMARY

The electronic device may support various codecs. For example, codecs may have different encoding methods, codec standards, bandwidths, and/or bitrates. The electronic device may negotiate with a network for parameters (e.g., encoding method, resolution, frame per second (FPS) codec standard, bandwidth, and/or bitrate) of codecs (e.g., audio codec and/or video codec) at the time of initiating an incoming call or an outgoing call. The electronic device may perform a video call by using a video codec and an audio codec corresponding to a set codec parameter.

The electronic device may record the video call (e.g., store the video in a storage) while performing the video call. The electronic device may record the video call as a file having a designated media container format. For example, the electronic device may convert a format of the video call in a format (e.g., moving picture experts group (MPEG) audio layer 4 (MP4)) playable on various devices, and store the video call of the converted format in the storage. When the codec used by the electronic device for the video call is supported by the designated media container, the electronic device may store an encoded media stream for the video call in the designated media container format. However, if the codec, used by the electronic device, for the video call is not supported by the designated media container, the electronic device may not be able to store the video call in the designated media container format. For example, an enhanced voice service (EVS) codec may be used for a video call. However, the EVS codec may not be a codec supported by the MP4 file format.

Aspects of the disclosure are to address at least the above-mentioned problems and/or disadvantages and to provide at least the advantages described below. Accordingly, an aspect of the disclosure is to provide a portable communication device including a camera, a touch display, an audio input circuit, an audio output circuit, a communication circuit, a memory, and at least one processor, and the at least one processor is configured to perform video call based on a first video codec and a first audio codec by using the communication circuit, receive, through the touch display, a request for recording the video call, and record the video call based on the first video codec and a second audio codec supported by the media container if the first audio codec is not supported by a designated media container.

Additional aspects will be set forth in part in the description which follows and, in part, will be apparent from the description, or may be learned by practice of the presented embodiments.

In accordance with an aspect of the disclosure, a method for recording a video call by an electronic device is provided. The method includes performing a video call based on a first video codec and a first audio codec, receiving, through a touch display of the electronic device, a request for recording the video call during the performing of the video call, and recording the video call based on the first video codec and a second audio codec supported by the media container if the first audio codec is not supported by a designated media container.

According to various embodiments of the disclosure, an electronic device may provide a method for recording a video call.

The electronic device may record a video call in a format of a designated media file while performing the video call using a codec that is not supported for the format of the designated media file.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and equivalents.

It is to be understood that the singular forms "a," "an," and "the" include plural referents unless the context clearly dictates otherwise. Thus, for example, reference to "a component surface" includes reference to one or more of such surfaces.

Figure 1:
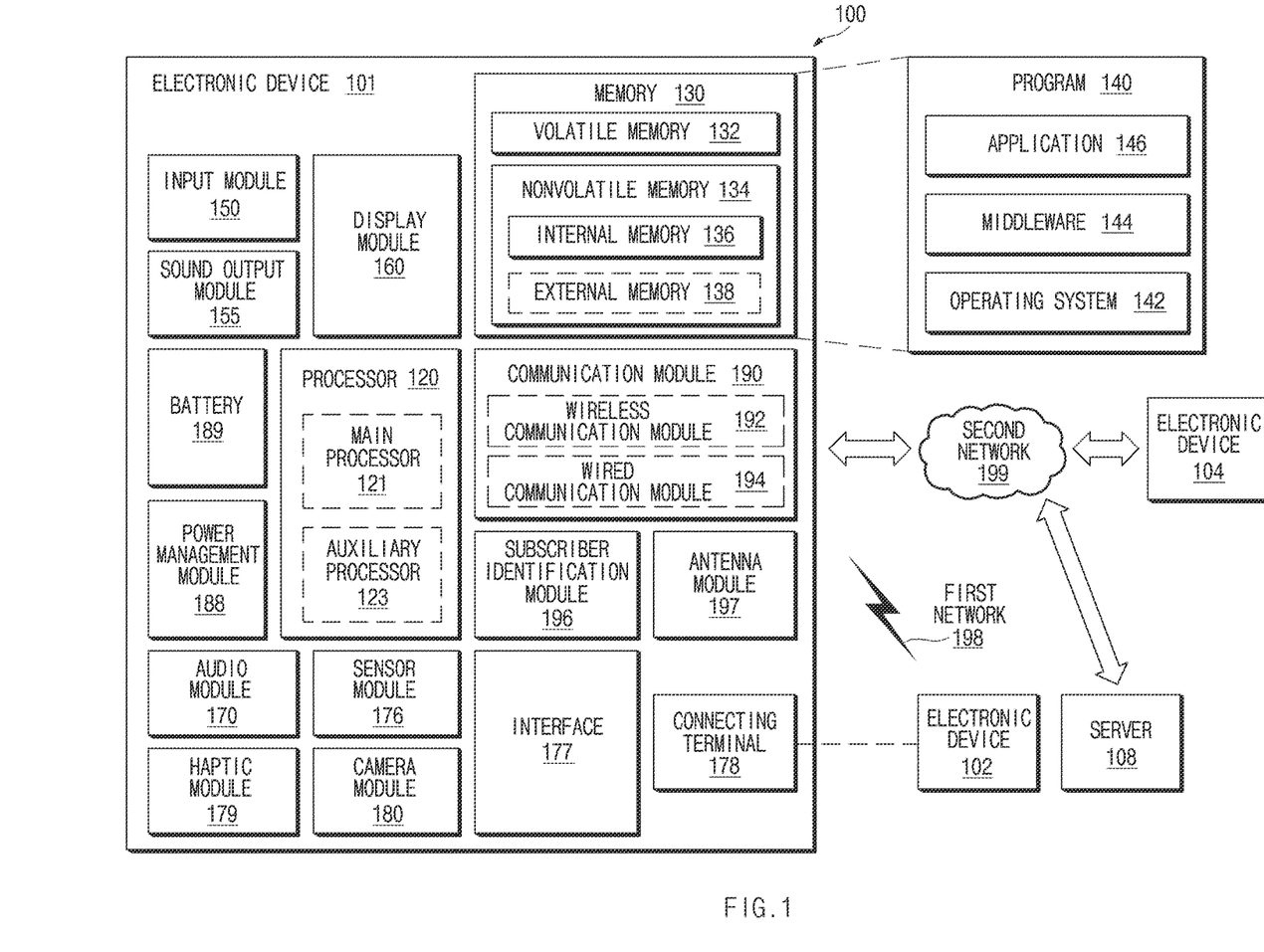
FIG. 1 illustrates a block diagram of an electronic device in a network according to an embodiment of the disclosure.

FIG. 1 is a block diagram illustrating an electronic device in a network environment 100 according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a cellular network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
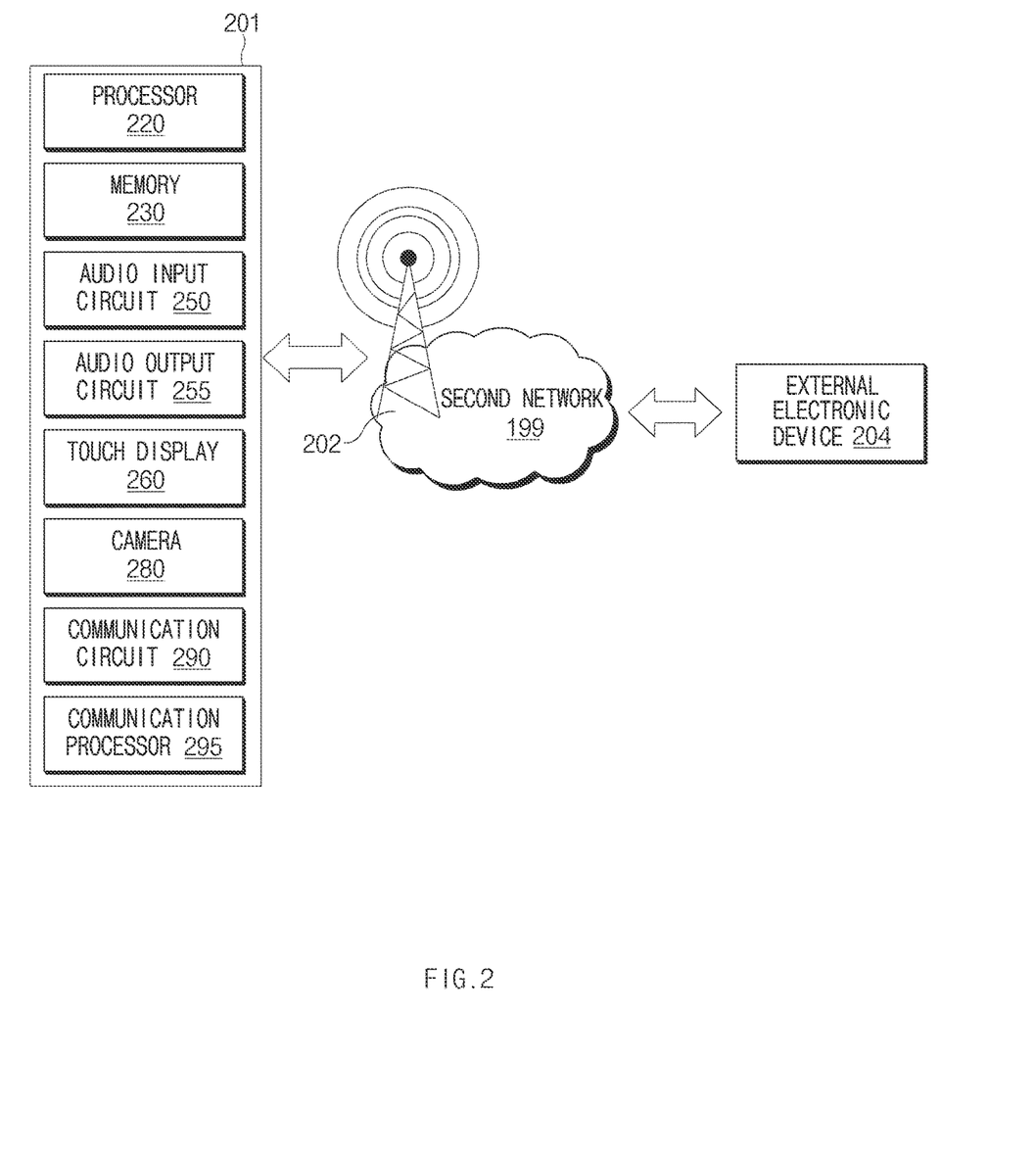
FIG. 2 illustrates a communication environment of an electronic device with an external electronic device, according to an embodiment of the disclosure.

FIG. 2 illustrates a communication environment of an electronic device with an external electronic device, according to an embodiment of the disclosure.

Referring to FIG. 2, an electronic device 201 (e.g., an electronic device 101 of FIG. 1) may include a processor 220 (e.g., a processor 120 of FIG. 1 (e.g., an application processor)), a memory 230 (e.g., a memory 130 of FIG. 1), an audio input circuit 250 (e.g., an input device 150 of FIG. 1), an audio output circuit 255 (e.g., a sound output device 155 of FIG. 1), a touch display (e.g., a display device 160 of FIG. 1), a camera 280 (e.g., a camera module 180 of FIG. 1), a communication circuit 290 (e.g., a communication module 190 of FIG. 1), and/or a communication processor 295 (e.g., a coprocessor, for example auxiliary processor 123 of FIG. 1). The configurations of the electronic device 201 illustrated in FIG. 2 are exemplary, and embodiments of the disclosure are not limited thereto. For example, the electronic device 201 may not include at least one of the components illustrated in FIG. 2. For another example, the electronic device 201 may further include a component not illustrated in FIG. 2.

According to an embodiment, the processor 220 may be operatively connected to the memory 230, the audio input circuit 250, the audio output circuit 255, the touch display 260, the camera 280, the communication circuit 290 and/or the communication processor 295. The processor 220 may control components of the electronic device 201. For example, the processor 220 may control the components of the electronic device 201 according to one or more instructions stored in the memory 230. According to an embodiment, the processor 220 may include an application processor. In FIG. 2, the processor 220 and the communication processor 295 are illustrated as separate configurations; however, according to an embodiment, the processor 220 and the communication processor 295 may be implemented as a single chip.

According to an embodiment, the audio input circuit 250 may receive an audio signal. For example, the audio input circuit 250 may include at least one microphone or be connected to at least one microphone in order to receive an audio signal. The audio input circuit 250 may convert the received analog audio signal into a digital signal. For example, the audio input circuit 250 may include an analog-to-digital converter (ADC).

According to an embodiment, the audio output circuit 255 may output the audio signal. For example, the audio output circuit 255 may include at least one transducer (e.g., a speaker) for outputting the audio signal. The audio output circuit 255 may include a digital-to-analog converter (DAC) for converting a digital signal into an analog signal.

According to an embodiment, the touch display 260 may display an image and receive a touch input. For example, the touch display 260 may include a plurality of pixels that emit light. The processor 220 may display an image by using at least some pixels of the touch display 260. The touch display 260 may include a touch sensing layer for sensing a touch input. The touch display 260 may transfer information on the acquired touch input to the processor 220.

According to an embodiment, the camera 280 may acquire an image. For example, the camera 280 may include an image sensor for acquiring images. The processor 220 may acquire an image of an external object by using the camera 280. For example, the processor 220 may acquire a still image and/or a moving picture by using the camera 280. In an example, the electronic device 201 may include a plurality of cameras.

According to an embodiment, the communication circuit 290 may provide the electronic device 201 with communication with the external electronic device 204 (e.g., the electronic device 102 of FIG. 1) through at least one network. For example, the communication circuit 290 may be configured to communicate with the external electronic device 204 via a base station 202 and a second network 199 (e.g., a cellular network). In an embodiment, the second network 199 may include at least one network entity that provides call services. For example, the network entity may include at least one server (e.g., an internet protocol (IP) Multimedia Subsystem (IMS) server of a $3^{rd}$ generation partnership project (3GPP)). In FIG. 2, the communication circuit 290 is illustrated as providing communication via the second network 199, however, embodiments of the disclosure are not limited thereto. For example, the communication circuit 290 may be configured to communicate with the external electronic device 204 through an Internet network connected to a short-range wireless network (e.g., a Wi-Fi network).

According to an embodiment, the communication processor 295 may be operatively connected to the communication circuit 290 and may communicate with the external electronic device 204 by using the communication circuit 290. The communication processor 295 may be operatively connected to the processor 220. For example, the electronic device 201 may include an interface for exchanging information between the communication processor 295 and the processor 220.

According to an embodiment, the electronic device 201 may be a portable communication device configured to perform a call. According to an embodiment, the electronic device 201 may be configured to perform a call based on packet data. For example, the electronic device 201 may be configured to perform a video call and/or a voice call based on packet data. According to an embodiment, the electronic device 201 may be configured to perform a packet-based call through a cellular network. For example, the electronic device 201 may be configured to perform a video call based on voice over long-term evolution (VoLTE). For another example, the electronic device 201 may be configured to perform a video call based on voice over Wi-Fi (VoWiFi). According to an embodiment, the electronic device 201 may perform a call by using an application for performing a call that is stored in the memory 230. For example, the application may include a call application and/or a mission critical push-to-talk (MCPTT) application. The electronic device 201 may perform a packet-based video call by using various modules. The description of various modules of the electronic device 201 may be referred to by the description with reference to FIG. 7.

According to an embodiment, the processor 220 may transmit, to the external electronic device 204, audio data acquired by the audio input circuit 250 and video data acquired by the camera 280 during the performing of the video call. For example, the processor 220 may encode audio data by using a designated audio codec and encode video data by using a designated video codec. The processor 220 may transmit the encoded audio data and the encoded video data to the external electronic device 204 by using the communication circuit 290. For example, the processor 220 may transmit a data packet including the media encoded audio data and the encoded video data to the external electronic device 204 by using the communication processor 295, based on a real-time transport protocol (RTP).

According to an embodiment, the processor 220 may receive a data packet including audio data and video data from the external electronic device 204 during the performing of the video call. For example, the processor 220 may receive a data packet from the external electronic device 204 by using the communication processor 295 and/or the communication circuit 290. The processor 220 may decode the received audio data by using an audio codec, and may decode the video data by using a video codec. The processor 220 may output the decoded audio data by using the audio output circuit 255. The processor 220 may output the decoded video data by using the touch display 260.

According to an embodiment, the processor 220 may record a video call during the performing of the video call. For example, the processor 220 may record a video call by using a designated media container. The processor 220 may use a general-purpose media container that is able to be played by various electronic devices. The processor 220 may use a media container in the moving picture experts group (MPEG) audio layer 4 (MP4) file format.

For example, the processor 220 may store audio data and video data received from the external electronic device 204 in a storage (e.g., the non-volatile memory 134 of FIG. 1) by using the media container. For another example, the processor 220 may store audio data and video data received from the external electronic device 204 together with an audio signal acquired by the audio input circuit 250 by using the media container. For yet another example, the processor 220 may store an audio signal acquired by the audio input circuit 250 and a video signal acquired by the touch camera 280, together with audio data and video data received from the external electronic device 204, by using the media container.

According to an embodiment, the electronic device 201 may record a video call while performing the video call. For example, if a user input requesting recording of the video call is acquired, the electronic device 201 may record the video call. The electronic device 201 may store the video call in the format of the designated media container. For example, the electronic device 201 may perform the video call with the external electronic device 204 based on a first video codec and a first audio codec. In this case, the first video codec and the first audio codec may be determined by negotiation between the electronic device 201 and the external electronic device 204. The codec used for the video call may not be supported by the designated media container. According to the embodiments of the disclosure, even if a codec not supported by the media container is used for the video call, the electronic device 201 may store the video call in the format of the media container.

According to an embodiment, at least one processor (e.g., processor 220 and/or communication processor 295) may be configured to, if the first audio codec is not supported by the designated media container, record the video call based on the second audio codec supported by the first video codec and the media container. For example, the first audio codec may be an evolved voice service (EVS) codec. For example, the second audio codec may include an adaptive multi-rate (AMR)-wideband (WB) codec and/or an AMR-narrowband (NB) codec. For example, the first video codec may include an H.264 codec or an H.265 codec. The processor 220 may be configured to record the video call based on the first video codec and the first audio codec if the first audio codec is supported by the designated media container. For example, a file extension of the media container may be MP4.

For example, at least one processor (e.g., the processor 220 and/or the communication processor 295) may receive data related to the video call from the external electronic device 204. The data related to the video call may include "encoded first audio data" encoded based on the first audio codec. The communication processor 295 may be configured to generate first audio data (e.g., pulse code modulation (PCM) data) by decoding the encoded first audio data.

For example, the at least one processor (e.g., the processor 220 and/or the communication processor 295) may be further configured to encode the first audio data and the second audio data (e.g., audio data including the user voice) received using the audio input circuit 250 by using the second audio codec.

According to an embodiment, the at least one processor (e.g., the processor 220 and/or the communication processor 295) may be further configured to generate merged data in which the first audio data and the second audio data are combined and encode the merged data by using the second audio codec. For example, the merged data may be audio data modulated by pulse code modulation (PCM).

According to an embodiment, the at least one processor (e.g., the processor 220 and/or the communication processor 295) may be further configured to, at the time of initiating the video call, determine the first video codec and the first audio codec through negotiation with the external electronic device based on a session initiation protocol (SIP).

According to an embodiment, the at least one processor (e.g., the processor 220 and/or the communication processor 295) may be further configured to acquire audio data using the audio input circuit 250, encode the audio data based on the first audio codec and transmit the encoded audio data to the external electronic device 204 by using the communication circuit 290.

According to an embodiment, the electronic device 201 may be configured to record the video call according to a type of an application related to the video call. For example, the video call may be performed by a push-to-talk (PTT) type application (e.g., an MCPTT application). In this case, the processor 220 may be configured to transmit the voice and image of the user in a time division manner after the video call is connected. For example, the processor 220 may transmit the voice and image of the user in the first time interval and stop transmitting the voice and image of the user in the second time interval. For example, the first time interval and the second time interval are distinguished form each other based on transmission request input. In this case, the processor 220 may be configured to transmit the voice and image of the user based on the transmission request input. For example, the processor 220 may be configured to transmit the voice and image of the user (e.g., an input to a button of the designated electronic device 201, an input to an arbitrary interface (e.g., a touch screen) of the electronic device 201, and/or a voice input of a designated signal to noise ratio (SNR) or higher) while the transmission request input is maintained (e.g., the first time interval). In this case, the processor 220 may stop outputting audio data and/or video data received from the external electronic device 204. While the transmission request input is not received (e.g., the second time interval), the processor 220 may output audio data and/or video data received from the external electronic device 204. For a video call based on a PTT type application, the processor 220 may record the voice and image of the user while the transmission request input is received, and may record audio data and video data received from the external electronic device 204 while the transmission request input is not being received. The processor 220 may record audio data and video data according to the methods described above. For another example, in the case where the video call is performed by an application other than the PTT method, the processor 220 may record a video call by combining the voice of the user and audio data received from the external electronic device 204. In this case, the processor 220 may be configured to record a video call by combining the image of the user and video data received from the external electronic device 204.

Hereinafter, various operations for video call recording of the electronic device 201 will be described with reference to FIGS. 3 to 7. Various embodiments to be described below may be combined with the operations of the electronic device 201 described above with reference to FIG. 2.

Figure 3:
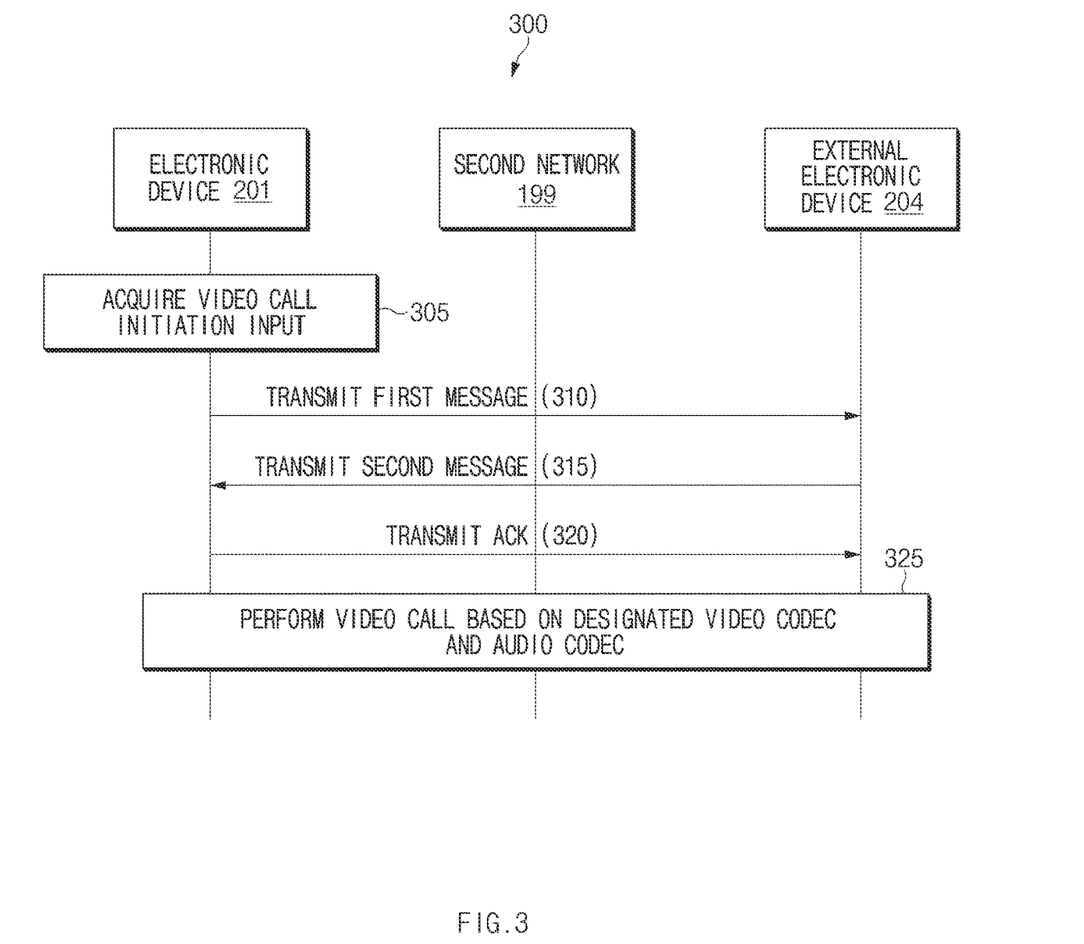
FIG. 3 illustrates a signal flow diagram of a method for performing a video call by an electronic device according to an embodiment of the disclosure.

FIG. 3 illustrates a signal flow diagram of a method for performing a video call by an electronic device according to an embodiment of the disclosure.

According to an embodiment, the electronic device 201 may acquire a video call initiation input in operation 305 of the signal flow diagram 300. For example, the electronic device 201 may receive a user input to a touch display (e.g., the touch display 260 of FIG. 2) as the video call initiation input. The electronic device 201 may provide an interface for initiating a video call with the execution of an application for performing a video call (e.g., a call application, or an MCPTT application), and may receive an input, as the video call initiation input, to the interface. For another example, the electronic device 201 may receive an input for executing an application for performing a video call as the video call initiation input. For example, in response to the video call initiation input, the electronic device 201 may perform operations 310, 315, and 320 according to a session initiation protocol (SIP) or a session description protocol (SDP).

According to an embodiment, in operation 310, the electronic device 201 may transmit the first message to the external electronic device 204 through the second network 199. For example, the first message may be an INVITE message. The first message may include information on at least one video codec and at least one audio codec that are supported for a video call of the electronic device 201. For example, the first message may include a list of video codecs supported by the electronic device 201. Information on video codecs in the video codec list may be sorted based on priority. The information on video codecs may include information on a codec type (e.g., H263, H264, and/or H265) and clock rate for each video codec. For example, the first message may include a list of audio codecs supported by the electronic device 201. Information on audio codecs in the audio codec list may be sorted based on priority. The information on audio codecs may include information on a codec type (e.g., EVS, AMR-WB, AMR-WB, AMR), clock rate, and/or the number of channels for each audio codec.

According to an embodiment, in operation 315, the electronic device 201 may receive a second message from the external electronic device 204. For example, the second message may be a 200 OK message. The second message may include information on at least one video codec and at least one audio codec that are supported for a video call of the external electronic device 204. For example, the second message may include a list of video codecs supported by the external electronic device 204. Information on video codecs in the video codec list may be sorted based on priority. The information on video codecs may include information on a codec type (e.g., H263, H264, and/or H265) and clock rate for each video codec. For example, the second message may include a list of audio codecs supported by the external electronic device 204. Information on audio codecs in the audio codec list may be sorted based on priority. The information on audio codecs may include information on a codec type (e.g., EVS, AMR-WB, AMR-WB, AMR), clock rate, and/or the number of channels for each audio codec.

According to an embodiment, the electronic device 201 and the external electronic device 204 may negotiate a video codec and an audio codec to be used for the video call by using the first message and the second message. For example, the electronic device 201 may use, for the video call, a video codec and an audio codec having the highest priority among at least one video codec and at least one audio codec matched in the first message and the second message. Similarly, the external electronic device 204 may also determine a video codec and an audio codec to be used for the video call.

According to an embodiment, in operation 320, the electronic device 201 may transmit an acknowledgment (ACK) for the second message to the external electronic device 204. If negotiation of video and audio codecs to be used for the video call fails, the electronic device 201 may transmit a message for renegotiation to the external electronic device 204 or determine the failure of the video call.

According to an embodiment, if the negotiation of the video and audio codecs to be used for the video call is successful, in operation 325, the electronic device 201 may perform a video call with the external electronic device 204 based on a designated video codec (e.g., negotiated video codec) and a designated audio codec (e.g., negotiated audio codec). For example, according to an embodiment, the processor 220 may transmit, to the external electronic device 204, audio data acquired by the audio input circuit 250 and video data acquired by the camera 280 while performing the video call. For example, the electronic device 201 may encode audio data acquired by using an audio input circuit (e.g., the audio input circuit 250 of FIG. 2) by using a designated audio codec, and may encode video data acquired using a camera (e.g., the camera 280 of FIG. 2) by using a designated video codec. The electronic device 201 may transmit the encoded audio data and the encoded video data to the external electronic device 204. For example, the electronic device 201 may receive a data packet including audio data and video data from the external electronic device 204 while performing a video call. The electronic device 201 may decode the received audio data by using an audio codec, and may decode the video data by using a video codec. The electronic device 201 may output the decoded audio data by using an audio output circuit (e.g., the audio output circuit 255 of FIG. 2). The electronic device 201 may output the decoded video data by using a display (e.g., the touch display 260 of FIG. 2).

Referring to FIG. 3, an electronic device 201 is illustrated as communicating with an external electronic device 204 via a second network 199; however, embodiments of the disclosure are not limited thereto. For example, the electronic device 201 may communicate with the external electronic device 204 by using a Wi-Fi network.

Figure 4:
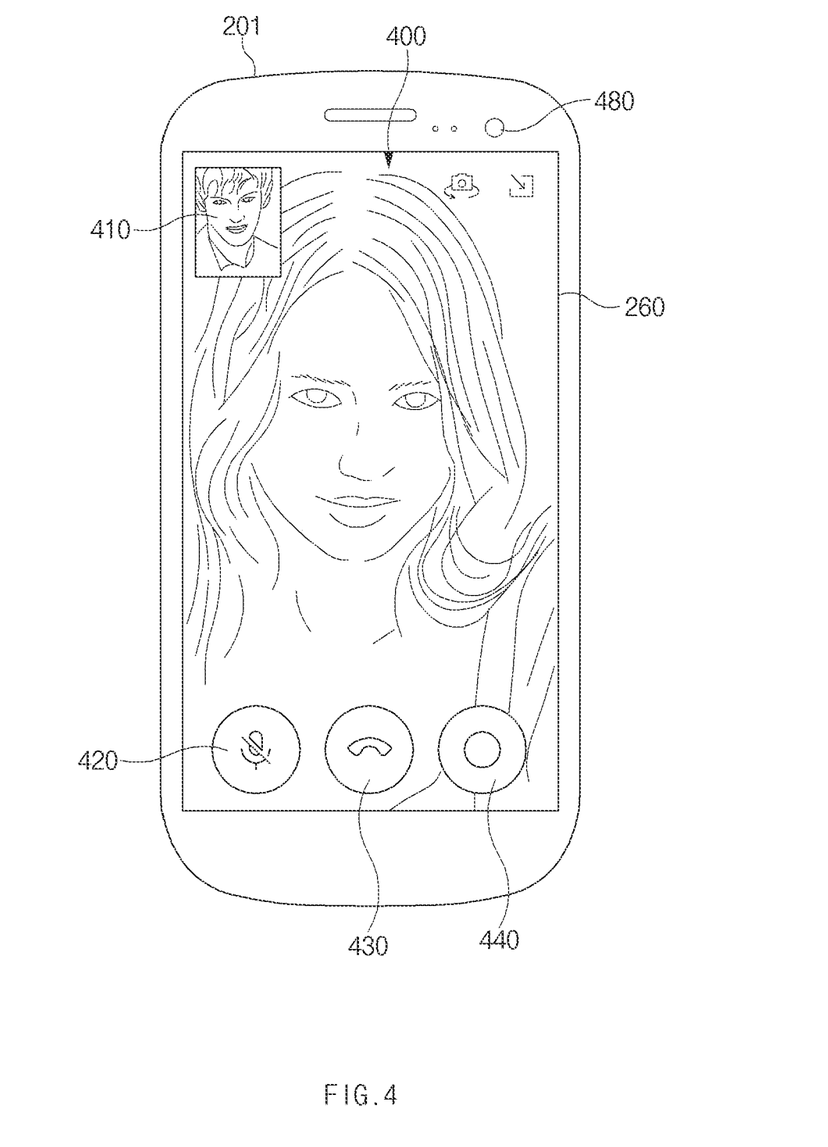
FIG. 4 illustrates a video call interface according to an embodiment of the disclosure.

FIG. 4 illustrates a video call interface according to an embodiment of the disclosure.

According to an embodiment, the electronic device 201 may display a video call interface 400 on the touch display 260 while performing the video call. For example, the electronic device 201 may display a video received from an electronic device of the other party on the video call interface 400 on the touch display 260. The electronic device 201 may display an image 410 acquired by a camera 480 (e.g., the camera 280 of FIG. 2) on the video call interface 400. In an example, the image 410 may be omitted from the video call interface 400.

Referring to FIG. 4, a video call interface 400 may include at least one graphic object for controlling a video call. For example, the at least one graphic object may include a mute button 420, an end button 430, and/or a record button 440. If an input to the mute button 420 is received, the electronic device 201 may stop acquiring an audio signal by the electronic device 201, or stop transmitting audio data to an external electronic device (e.g., the external electronic device 204 of FIG. 2). When an input to the end button 430 is received, the electronic device 201 may terminate a video call. When an input to the record button 440 is received, the electronic device 201 may record a video call.

According to an embodiment, the electronic device 201 may record a video call by storing the video call in a designated media container format. For example, the designated media container format may be referred to as a format of a media file having a MP4 file extension. Hereinafter, a structure of a media file having a schematic MP4 file extension may be described with reference to FIG. 5.

Figure 5:
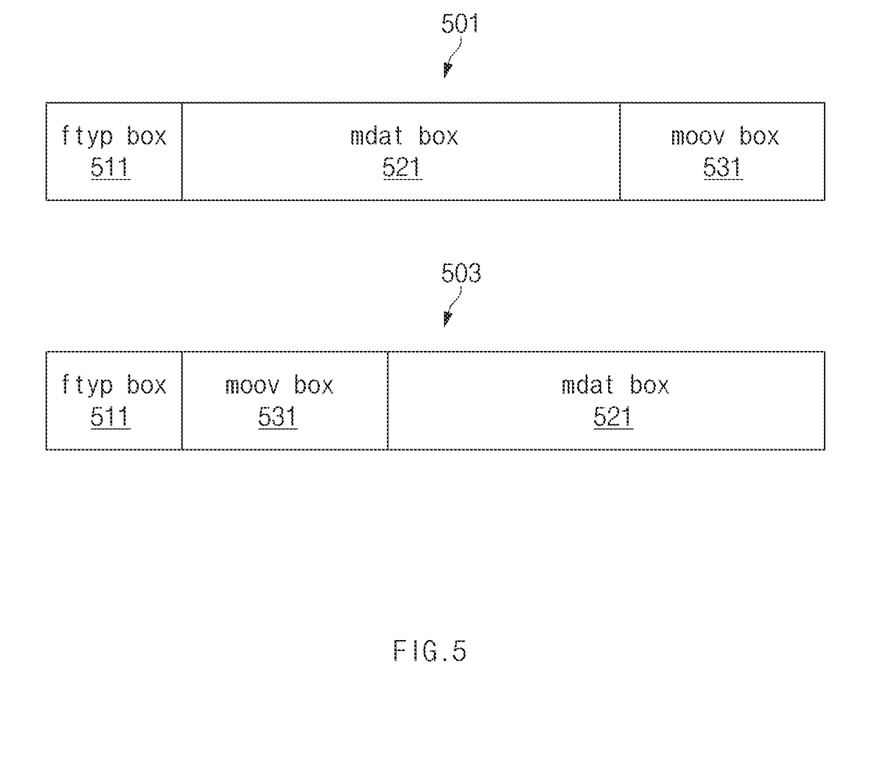
FIG. 5 illustrates a structure of moving picture experts group (MPEG) audio layer 4 (MP4) file container according to an embodiment of the disclosure.

FIG. 5 illustrates a structure of an MP4 file container according to an embodiment of the disclosure.

The MP4 file format may have a structure according to the ISO/IEC 14496-12 ISO base media file format by a technology for compressing data such as video and audio through encoding and then storing the compressed data in an MP4 file format. For example, the MP4 file format may be basically divided into box units. For example, the MP4 file format may include a ftyp box (file type box) 511, an mdat box (media data box) 521, and/or a moov box (movie box) 531. The ftyp box 511 may include information about file types and compatibility. The mdat box 521 may include video data and audio data. The moov box 531 may include metadata and may constitute the top level of an MP4 file.

Referring to FIG. 5, as shown at reference numeral 501, the moov box 531 may be located at the end of the file. For another example, as shown by reference numeral 503, the moov box 531 may be located at the front of the file. The moov box 531 may include track information for each data. The track information may include information on a data format (e.g., a type of a video codec, a video resolution, a type of an audio codec, the number of audio channels, a sampling rate, and/or a sampling bit).

For example, an electronic device (e.g., the electronic device 201 of FIG. 2) may record and store a video call according to the structure of the MP4 file format shown in FIG. 5.

Figure 6:
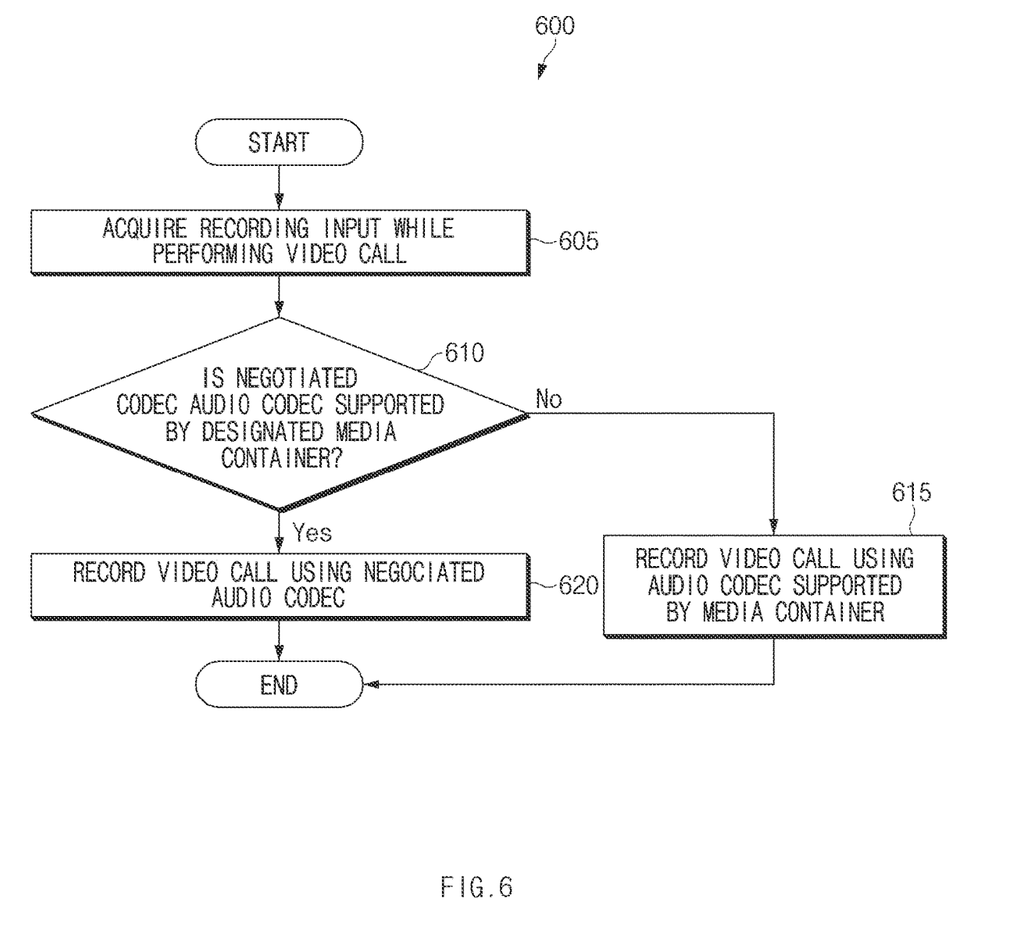
FIG. 6 is a flowchart of a video call recording method according to an embodiment of the disclosure.

FIG. 6 is a flowchart of a video call recording method according to an embodiment of the disclosure.

Referring to FIG. 6 depicting flowchart 600, operations 605 to 620 may be performed in at least one of a processor (e.g., the processor 220 of FIG. 2) or a communication processor (e.g., the communication processor 295 of FIG. 2 of an electronic device (e.g., the electronic device 201 of FIG. 2)).

According to an embodiment, in operation 605, the electronic device (e.g., the electronic device 201) may acquire a recording input while performing a video call. For example, the electronic device 201 may acquire an input to a touch display (e.g., the touch display 260 of FIG. 2) (e.g., an input to the record button 440 of FIG. 4) as a recording input. For another example, the electronic device 201 may acquire an input to an accessory connected to the electronic device 201 and a voice input to the electronic device 201 as recording inputs.

According to an embodiment, in operation 610, the electronic device 201 may determine whether a negotiated audio codec is an audio codec supported by a designated media container. For example, the negotiated audio codec may be referred to as an audio codec currently used by the electronic device 201 (and the external electronic device) for the video call.

According to an embodiment, in operation 615, if the negotiated audio codec is not supported by the designated media container (e.g., No in 610), the electronic device 201 may record the video call using an audio codec supported by the media container. For example, the designated media container may have the MP4 format. If the electronic device 201 performs the video call by using the EVS codec, the EVS codec may not be supported by the MP4 format. In this case, the electronic device 201 may record the video call by using another codec (e.g., AMR-WB, AMR-NB) supported by the MP4 format for audio data. For example, in the electronic device 201, the negotiated audio codec may be a first audio codec, and an audio codec used for recording the video call may be a second audio codec. In this case, the electronic device 201 may decode the encoded audio data received from the external electronic device 204 by using the first audio codec and encode the decoded audio data by using the second audio codec. The electronic device 201 may store the audio data encoded by the second audio codec together with the video data in a designated media container format.

According to an embodiment, in operation 620, if the negotiated audio codec is supported by the designated media container (e.g., Yes in 610), the electronic device 201 may record the video call using the negotiated audio codec. For example, the designated media container may have the MP4 format. If the electronic device 201 performs the video call by using the AMR-WB or AMR-NB codec, the negotiated codec may be supported by the MP4 format. In this case, the electronic device 201 may record the video call by using audio data received from the external electronic device as it is.

Figure 7:
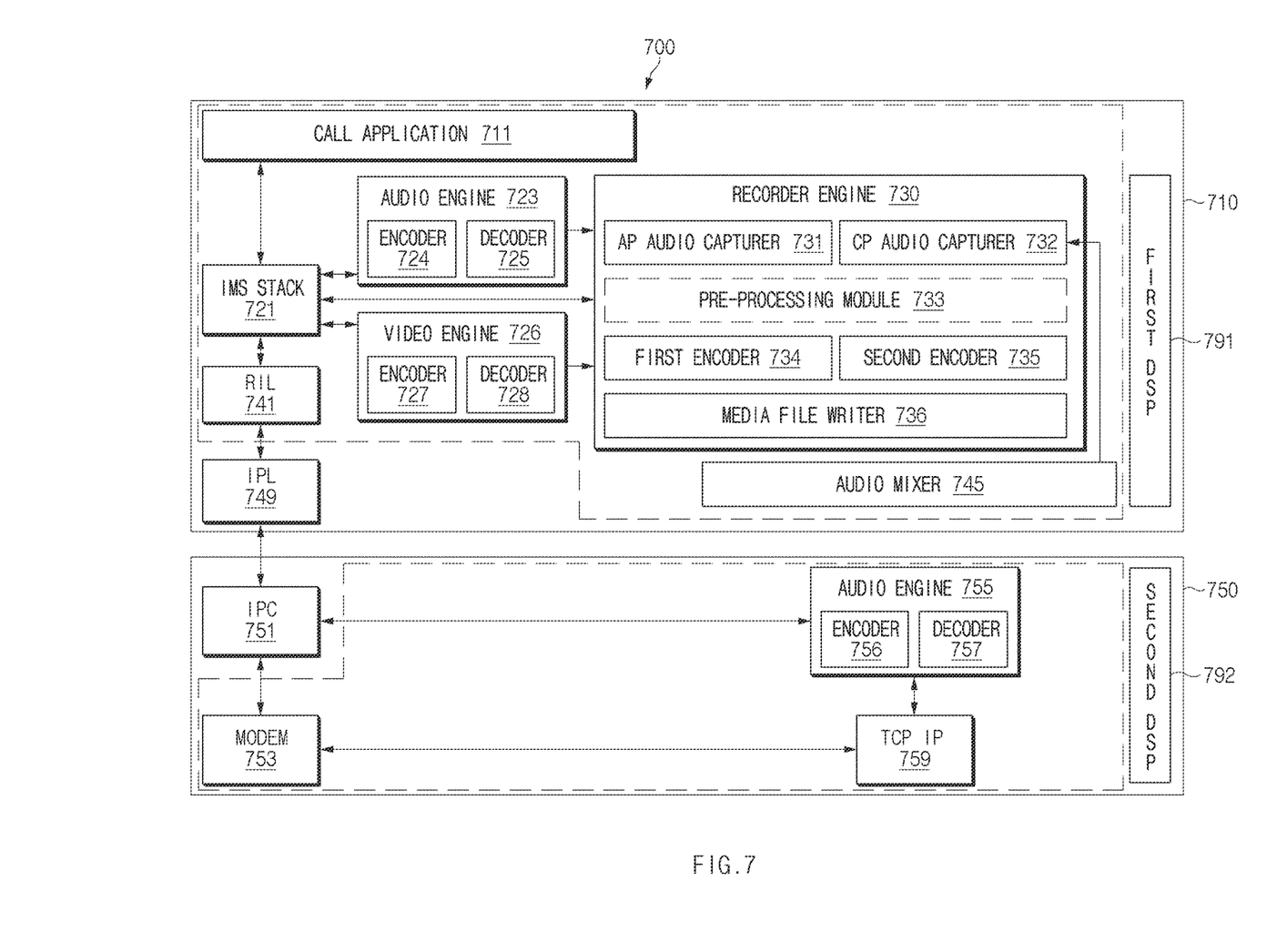
FIG. 7 illustrates a block diagram of an electronic device according to an embodiment of the disclosure.

FIG. 7 illustrates a block diagram of an electronic device according to an embodiment of the disclosure.

At least some of components of an electronic device of FIG. 7 (e.g., an electronic device 201 of FIG. 2) may be software modules generated by a processor (e.g., a processor 220 of FIG. 2) and/or a communication processor (e.g., a communication processor 295 of FIG. 2) executing instructions stored in a memory. Alternatively, at least some of the components of the electronic device 201 of FIG. 7 may be hardware modules implemented by dedicated hardware chips.

Referring to FIG. 7 depicting block diagram 700, an application processor (AP) 710 may include a processor 220 and/or modules executed by a processor 220 (e.g., program modules). According to an embodiment, the AP 710 (e.g., the processors 120 and 220) may include a call application 711, an internet multimedia subsystem stack (IMS stack), 721, an audio engine 723, a video engine 726, and a recorder engine 730, an audio mixer 745, a radio interface layer (RIL) 741, and/or an inter processor communication (IPC) module 749. For example, at least some of the call application 711, the internet multimedia subsystem stack (IMS stack) 721, the audio engine 723, the video engine 726, the recorder engine 730, the audio mixer 745, the radio interface layer (RIL) 741, and the IPC module 749 may be included in the memory 130 as modules for the program 140, and the processor 220 of the AP 710 may read the program 140 from the memory and execute the modules.

For example, the call application 711 may include at least one application (e.g., a call application, an MCPTT application) for supporting a video call. The call application 711 may provide an interface (e.g., the interface 400 of FIG. 4) for performing a video call when executed.

For example, the IMS stack 721 may negotiate with an external electronic device (e.g., the external electronic device 204 of FIG. 2) about an audio codec and a video codec to be used for a video call based on SIP/SDP.

For example, the audio engine 723 may include an encoder 724 and a decoder 725. The audio engine 723 may decode audio data received from the external electronic device 204 by using the decoder 725 corresponding to the audio codec negotiated by the IMS stack 721. The decoded audio data may be processed by a first audio digital signal processor (DSP) 791 and may be output through an audio output circuit (e.g., the audio output circuit 255 of FIG. 2). The audio engine 723 may encode audio data by using the encoder 724 corresponding to the audio codec negotiated by the IMS stack 721. For example, the encoder 724 may encode audio data (e.g., PCM audio data) received from the audio mixer 745 with the negotiated audio codec. The electronic device 201 may transmit encoded audio data to an external electronic device.

For example, the video engine 726 may include an encoder 727 and a decoder 728. The video engine 726 may decode video data received from the external electronic device 204 by using the decoder 728 corresponding to the video codec negotiated by the IMS stack 721. The decoded video data may be output through a display (e.g., the touch display 260 of FIG. 2). The video engine 726 may encode the video data using the encoder 727 corresponding to the video codec negotiated by the IMS stack 721. For example, the encoder 727 may encode video data acquired by a camera. The electronic device 201 may transmit the encoded video data to the external electronic device 204.

For example, the recorder engine 730 may be configured to record a video call into a designated media container. The recorder engine 730 may include an AP audio capturer 731, a communication processor (CP) audio capturer 732, a pre-processing module 733, a first encoder 734, a second encoder 735, and/or a media file writer 736. The recorder engine 730 may record a video call into the designated media container using the audio data and the video data. For example, the recorder engine 730 may determine whether the first audio codec negotiated by the IMS stack 721 is an audio codec supported by the designated media container. If the first audio codec is a supported audio codec, the recorder engine 730 may encode audio data by using an encoder corresponding to the sampling rate (e.g., 8 KHz or 16 KHz) of the first audio codec among the first encoder 734 or the second encoder 735, and may record a video call by using the media file writer 736. In the case where the first audio codec is an unsupported audio codec, the recorder engine 730 may encode audio data by using an encoder designated among the first encoder 734 or the second encoder 735. For example, the recorder engine 730 may encode data by using an encoder corresponding to the sampling rate (e.g., 8 KHz, 16 KHz, or 32 KHz) of the first audio codec among the first encoder 734 and the second encoder 735, and may record a video call by using the media file writer 736.

For example, the AP audio capturer 731 may acquire audio data acquired by the AP. The audio data acquired by the AP may include audio data (e.g., PCM audio data) decoded by the audio engine 723, audio data encoded by the audio engine 723 and/or audio data (e.g., audio data acquired by the audio input circuit 250) received from an audio second DSP 792.

For example, the CP audio capturer 732 may acquire audio data acquired by the CP. The audio data acquired by the CP may include audio data (e.g., PCM audio data) decoded by the audio engine 755 and/or audio data encoded by the audio engine 755.

For example, the pre-processing module 733 may perform various pre-processing operations on audio data acquired by the AP audio capturer 731 and/or the CP audio capturer 732. For example, the pre-processing module 733 may perform mixing, resampling, and/or transcoding of audio data. For example, the pre-processing module 733 may convert audio data encoded by the first audio codec into audio data encoded by the second audio codec.

For example, the first encoder 734 may be configured to encode audio data with a designated audio codec (e.g., AMR-NB), and the second encoder 735 may be configured to encode audio data with another audio codec (e.g., AMR-WB). The first encoder 734 and the second encoder 735 may use an audio codec supported by a designated media container. The sampling rate of the audio codec of the first encoder 734 and the sampling rate of the audio codec of the second encoder 735 may be different from each other. For example, the sampling rate (e.g., 8 KHz) of the audio codec of the first encoder 734 may be less than the sampling rate (e.g., 16 KHz) of the audio codec of the second encoder 735.

The media file writer 736 may store the encoded audio data and the encoded video data as a file of a designated media container format. For example, the media file writer 736 may store the video call in the memory in an MP4 file format.

The RIL 741 may provide a network interface between the AP 710 and a CP 750.

The IPC 749 may support data communication between the AP 710 and the CP 750.

For example, when audio data is processed by the audio engine 755 of the CP, the audio mixer 745 may acquire audio data through the IPC 749 and the RIL 741. For another example, the audio mixer 745 may acquire audio data of the audio engine 755 through a separate path.

The audio mixer 745 may mix various audio data. For example, the audio mixer 745 may mix audio data acquired by the CP, audio data acquired by the AP, and/or audio data acquired by the audio first DSP 791. The audio mixer 745 may mix PCM-modulated audio data and output the mixed audio data. For example, the audio mixer 745 may output various PCM-modulated audio data such as 8 KHz, 16 KHz, 32 KHz, or 44.1 KHz sampling rates. The audio data output from the audio mixer 745 may be output through the audio output circuit. In an example, the recorder engine 730 may store an audio signal in which the audio signal acquired by the electronic device 201 and the audio signal acquired by the external electronic device 204 are mixed together by recording the video call using the audio signal output from the audio mixer 745.

According to an embodiment, the communication processor (CP) 750 may include the communication processor 295 and/or modules (e.g., program modules) executed by the communication processor 295. For example, the CP 750 may include an inter processor communication (IPC) 751, a modem 753, an audio engine 755, and/or a transmission control protocol/internet protocol (TCP/IP) 759. For example, the IPC 751 may support data communication between the CP and the AP. The modem 753 may process (e.g., process data on a physical layer) a signal for communication with the external electronic device. The audio engine 755 may decode the audio data received from the TCP/IP stack 759 by using the decoder 757, and transmit the decoded audio data to the audio mixer 745. The audio engine 755 may encode the audio data acquire by the electronic device 201 by using the encoder 756, and transmit the encoded audio data to the TCP/IP stack 759.

For example, at least some of the inter processor communication (IPC) 751, the modem 753, the audio engine 755, and/or the TCP IP 759 may be included in the memory 130 as modules for the program 140, and the CP 750 (e.g., the communication processor 295) may read the program 140 from the memory and execute the modules.

According to an embodiment, the IMS stack 721 may negotiate the audio codec not supported by the MP4 file format as an audio codec (e.g., EVS) for the video call. In an example, audio data received from the external electronic device 204 in the video call may be decoded by the audio engine 755 or the audio engine 723. In this case, the decoded audio data of the external electronic device 204 may have a sampling rate of 32 KHz. The decoded audio data of the external electronic device 204 and the audio data acquired by the electronic device 201 may be mixed by the audio mixer 745. For example, the mixed audio data may be PCM-modulated audio data having a relatively low sampling rate (e.g., 8 KHz or 16 KHz) compared to the negotiated audio codec. That is, down-sampling may be performed on audio data. In this case, the recorder engine 730 may encode the PCM-modulated audio data by using an encoder. For example, the recorder engine 730 may encode the PCM-modulated audio data at a sampling rate of 8 KHz by using the first encoder 734. For another example, for 16 KHz audio data, the recorder engine 730 may encode the PCM-modulated audio data by using the second encoder 735. The media file writer 736 may store the encoded video data received from the external electronic device and the audio data encoded by the recorder engine 730 in a designated media file format.

According to an embodiment, the IMS stack 721 may negotiate the audio codec supported by the MP4 file format as an audio codec (e.g., AMR-WB, AMR-NB) for the video call. In an example, audio data received from the external electronic device 204 in the video call may be decoded by the audio engine 755 or the audio engine 723. In this case, the decoded audio data of the external electronic device 204 may have a sampling rate of 8 KHz or 16 KHz. The decoded audio data of the external electronic device 204 and the audio data acquired by the electronic device 201 may be mixed by the audio mixer 745. For example, the mixed audio data may be PCM-modulated audio data having a sampling rate (e.g., 8 KHz or 16 KHz) corresponding to the sampling rate of the received audio data. In this case, the recorder engine 730 may encode the PCM-modulated audio data by using a corresponding encoder. For example, for 8 KHz audio data, the recorder engine 730 may encode the PCM-modulated audio data by using the first encoder 734. For another example, for 16 KHz audio data, the recorder engine 730 may encode the PCM-modulated audio data by using the second encoder 735. The media file writer 736 may store the encoded video data received from the external electronic device and the audio data encoded by the recorder engine 730 in a designated media file format. In another example, audio data received from the external electronic device 204 in the video call may be decoded by the audio engine 723.

According to an embodiment, the IMS stack 721 may negotiate the audio codec not supported by the MP4 file format as an audio codec (e.g., EVS) for the video call. In an example, audio data received from the external electronic device 204 in the video call may be decoded by the audio engine 723. In this case, the decoded audio data of the external electronic device 204 may have a sampling rate of 32 KHz. The decoded audio data of the external electronic device 204 and the audio data acquired by the electronic device 201 may be mixed by the audio mixer 745. For example, the mixed audio data may be PCM modulated audio data having a sampling rate (e.g., 32 KHz) corresponding to the negotiated audio codec. The audio engine 723 may encode the PCM-modulated audio data with the negotiated audio codec by using the encoder 724, and transmit the encoded audio data to the pre-processing module 733. The pre-processing module 733 may perform transcoding on the audio data encoded with the negotiated audio codec to change the audio data into audio data encoded by the audio codec supported by the designated media container. The audio data transcoded by the pre-processing module may be stored in a file format designated by the media file writer 736 together with the video data received from the external electronic device 204. In this case, only one audio engine 723 may be used for decoding and encoding audio data. For example, the first encoder 734 and the second encoder 735 may be omitted. Power consumption of the electronic device 201 may be reduced by using only one audio engine 723 (in particular, one encoder 724).

According to an embodiment, the IMS stack 721 may negotiate the audio codec not supported by the MP4 file format as an audio codec (e.g., EVS) for the video call. In an example, audio data received from the external electronic device 204 in the video call may be decoded by the audio engine 755 or the audio engine 723. In this case, the decoded audio data of the external electronic device 204 may have a sampling rate of 32 KHz. For example, the recorder engine 730 may encode the decoded audio data into audio data in a format supported by the designated media container by using the first encoder 734 or the second encoder 735. For another example, the recorder engine 730 may convert the audio data received from the external electronic device 204 into audio data in a format supported by the designated media container by using the pre-processing module 733. In this case, the pre-processing module 733 may perform transcoding for conversion of audio data. The media file writer 736 may store the audio data received from the external electronic device 204 and converted to have the designated format, together with the video data received from the external electronic device 204, by using the designated media container format.

According to an embodiment, the IMS stack 721 may negotiate the audio codec not supported by the MP4 file format as an audio codec (e.g., EVS) for the video call. In an example, voice data for the user of the electronic device 201 (e.g., audio data acquired by the electronic device 201) may be encoded by the audio engine 755 or the audio engine 723. In this case, the encoded user voice data may have a sampling rate of 32 KHz. For example, the recorder engine 730 may encode the user voice data (e.g., PCM data) into audio data in a format supported by the designated media container by using the first encoder 734 or the second encoder 735. For another example, the recorder engine 730 may convert the encoded user voice data into audio data in a format supported by the designated media container by using the pre-processing module 733. In this case, the pre-processing module 733 may perform transcoding for conversion of the encoded user voice data. The media file writer 736 may store the user voice data converted to have the designated format, together with the video data acquired by the electronic device 201, by using the designated media container format.

According to an embodiment, the IMS stack 721 may negotiate the audio codec supported by the MP4 file format as an audio codec (e.g., AMR-WB, AMR-NB) for the video call. In an example, the media file writer 736 may store video data and audio data received from the external electronic device 204 in the video call in the MP4 file format. The media file writer 736 may store voice data and video data acquired by the electronic device 201 in the video call in the MP4 file format. For example, the media file writer 736 may generate an MP4 file including video data and audio data received from the external electronic device 204 in a first time interval, and including voice data and video data acquired by the electronic device 201 in a second time interval.

According to an embodiment, the IMS stack 721 may negotiate the audio codec supported by the MP4 file format as an audio codec (e.g., AMR-WB, AMR-NB) for the video call. For example, the user voice may be encoded with a negotiated audio codec by the encoder 724. In an example, the media file writer 736 may store video data and audio data received from the external electronic device 204 in the video call in the MP4 file format. The media file writer 736 may store the audio data encoded by the encoder 724 and the audio data received from the external electronic device 204 together in the video call. In this case, it is possible to reduce the number of encoders used for encoding audio data, and thus it is possible to reduce power consumption of the electronic device 201.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A portable communication device comprising:
   a camera;
   a touch display;
   an audio input circuit;
   an audio output circuit;
   a communication circuit;
   a memory; and
   at least one processor operatively connected to the camera, the touch display, the audio input circuit, the audio output circuit, the communication circuit, and the memory,
   wherein the at least one processor is configured to:
      perform a video call based on a first video codec and a first audio codec using the communication circuit,
      receive, through the touch display, a request for recording the video call, and
      record the video call based on the first video codec and a second audio codec supported by a media container if the first audio codec is not supported by a designated media container.

2. The portable communication device of claim 1, wherein the at least one processor is further configured to record the video call based on the first video codec and the first audio codec if the first audio codec is supported by the designated media container.

3. The portable communication device of claim 1, wherein the at least one processor is further configured to:
   receive encoded first audio data encoded based on the first audio codec from an external electronic device; and
   generate first audio data by decoding the encoded first audio data.

4. The portable communication device of claim 3, wherein the at least one processor is further configured to encode second audio data and the first audio data using the second audio codec, the second audio data being received using the audio input circuit.

5. The portable communication device of claim 4, wherein the at least one processor is further configured to:
   generate merged data in which the first audio data and the second audio data are combined; and
   encode the merged data using the second audio codec.

6. The portable communication device of claim 5, wherein the merged data is modulated by pulse code modulation (PCM).

7. The portable communication device of claim 1, wherein a file extension of the media container is moving picture experts group (MPEG) audio layer 4 (MP4).

8. The portable communication device of claim 1, wherein the first audio codec includes an enhanced voice service (EVS) codec.

9. The portable communication device of claim 1, wherein the at least one processor is further configured to, for initiating the video call, determine the first video codec and the first audio codec through negotiation with an external electronic device based on a session initiation protocol (SIP).

10. The portable communication device of claim 9, wherein the at least one processor is further configured to:
    acquire audio data by using the audio input circuit;
    encode the audio data based on the first audio codec; and
    transmit the encoded audio data to the external electronic device by using the communication circuit.

11. A method for recording a video call by an electronic device, the method comprising:
    performing a video call based on a first video codec and a first audio codec;
    receiving, through a touch display of the electronic device, a request for recording the video call during the performing of the video call; and
    recording the video call based on the first video codec and a second audio codec supported by a media container if the first audio codec is not supported by a designated media container.

12. The method of claim 11, further comprising recording the video call based on the first video codec and the first audio codec if the first audio codec is supported by the designated media container.

13. The method of claim 11, wherein the performing of the video call includes:
    receiving encoded first audio data encoded based on the first audio codec from an external electronic device; and
    generating first audio data by decoding the encoded first audio data.

14. The method of claim 13, wherein the recording of the video call based on the second audio codec includes encoding second audio data and the first audio data received using an audio input circuit of the electronic device by using the second audio codec.

15. The method of claim 14, further comprising:
    generating merged data in which the first audio data and the second audio data are combined; and
    encoding the merged data by using the second audio codec.

* * * * *